Figure 1:
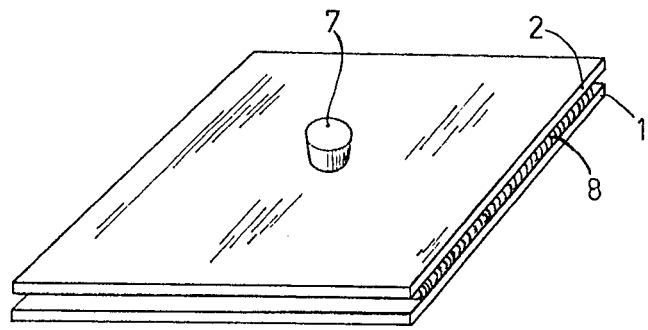

United States Patent [19]

Schoot et al.

[11] 3,806,229

[45] Apr. 23, 1974

[54] IMAGE DISPLAY APPARATUS

[75] Inventors: Cornelis Johannes Schoot; Johannes Jacobus Ponjee, both of Emmasingel, Eindhoven, Netherlands

[73] Assignee: U.S. Philips Corporation, New York, N.Y.

[22] Filed: June 23, 1971

[21] Appl. No.: 155,871

[30] Foreign Application Priority Data
June 27, 1970 Netherlands.................... 7009521

[52] U.S. Cl. .......... 350/160 LC, 252/408, 350/150, 23/230 LC
[51] Int. Cl............................ G02f 1/28, G02f 1/26
[58] Field of Search..... 96/1; 252/408; 350/160 LC; 340/334; 204/181

[56] References Cited
UNITED STATES PATENTS
3,458,305   7/1969   Doyle..................................... 71/92

Primary Examiner—Charles E. Van Horn
Assistant Examiner—M. B. Wittenberg
Attorney, Agent, or Firm—Norman N. Spain; Frank R. Trifari

[57] ABSTRACT

The invention relates to an image display apparatus provided with at least two electrodes to which a direct voltage or a square-wave or alternating voltage may be applied. The electrodes are in contact with a solution of a reversible reducible organic substance of the formula I and an adjuvant. Suitable adjuvants are substituted hydroquinones, ferrous salts and 1,4-di (dialkylamino) benzenes. When the voltage is applied compounds of the formula I are reduced to intensely coloured radical ions. Oxidation of the adjuvant takes place at the anode.

22 Claims, 4 Drawing Figures

PATENTED APR 23 1974　　　　　　　　　　　3,806,229

IMAGE DISPLAY APPARATUS

The invention relates to an image display apparatus comprising a solution of a reversibly reducible organic substance and an adjuvant in an inert solvent, which solution is in contact with at least two inert electrodes.

German Pat. specification No. 1,243,269 describes such an apparatus. The reversibly reducible organic substances used in this apparatus are compounds which — after reduction — are oxidized by losing an electron so as to assume their excited singlet state. The molecules return from the excited state to the ground state with the emission of light.

Since in order to obtain this light effect first a reduction and subsequent an oxidation of the reduced substance are required, this known apparatus is operated by applying an alternating voltage to the electrodes.

The adjuvant used is an inorganic salt, for example an alkali, alkaline earth or ammonium perchlorate, to impart sufficient electric conductivity to the system.

The known apparatus has several serious disadvantages:

Unless high current densities are used, the image is poorly perceptible in light surroundings (daylight)

The apparatus produces an image only as long as the alternating voltage is applied. Maintaining the image requires supplying the same amount of energy as does production of the image.

The value of the voltage depends upon the luminescent substance. For blueluminescing substances, however, voltages of several tens of volts are necessary.

Operation of the apparatus requires the use of an alternating voltage, so that mere use of a battery is not sufficient.

Unless both electrodes are visible, one half of the light produced is lost to perception because luminescence occurs both at the anode and, after polarity reversal, at the other electrode.

The present invention provides an image display apparatus which does not suffer from these disadvantages.

According to the invention, a compound of the formula I

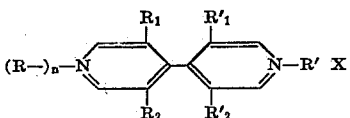

is used as the reducible substance. At the cathodes the compounds accept electrons so as to be converted into radical ions, which have a very high extinction in the visible part of the spectrum. The compounds as such have no, or hardly any, colour so that even at the passage of a very small current high-contrast images are obtained.

Accordingly, the invention relates to an image display apparatus which comprises a solution of a reversibly reducible organic substance and an adjuvant in an inert solvent, which solution is in contact with at least two inert electrodes, characterized in that the reversibly reducible organic substance is a compound of the formula I

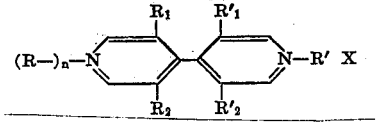

where R and R' each represent an alkyl or cycloalkyl group containing up to 18 carbon atoms or an unsaturated alkyl or cycloalkyl group containing up to 12 carbon atoms or an aralkyl or alkaryl group containing up to 10 carbon atoms or a phenyl group, which groups may be substituted in the aromatic nucleus with $CF_3$, a halogen, $CH_3$, $OCH_3$, or $NO_2$, a carbonamido-alkyl group in which the nitrogen atom may carry one or two alkyl groups which together with a hetero-atom may form a ring, which group may contain up to 10 carbon atoms, an alkoxycarbonylalkyl group containing up to 16 carbon atoms, a thienylalkyl group containing up to 10 carbon atoms or a nitrile group, whilst R may also be the group

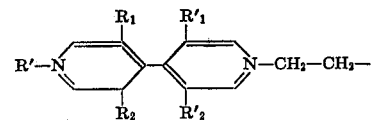

$R_1$ and $R'_1$ each represent a hydrogen atom or together a — CH = CH — group, $R_2$ and $R'_2$ have the same meanings as have $R_1$ and $R'_1$, n is zero or unity and X represents an electrochemically inert anion.

Examples of groups which may be represented by R and R' are methyl, n-propyl, i-propyl, sec, butyl, n-heptyl, alkyl, benzyl, 3,5-dimethylmorpholinylcarbonylmethyl, 1-propionylethyl-1, carbonamidomethyl, dodecyl, ω-methoxycarbonyldecyl, hexadecanyl, phenyl, 2,4,6-trinitrophenyl and the like.

Compounds of the formula I in which R represents the group

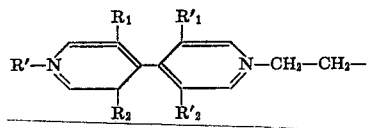

may be prepared from a compound of the formula I, where n = 0, and 1,2-dibromomethane.

Examples of electrochemically inert anions are perchlorate, boron tetrafluoride, halides, phosphate and the like. Boron tetrafluoride is frequently preferred.

The apparatus according to the invention may be operated at very small voltages of, for example, about one or a few volts. The image produced may be erased by applying no voltage to the electrodes. To maintain the image for a prolonged period of time requires a current which is considerably smaller even than the small current required to produce the image.

Consequently, because of the small current consumption and the low voltage required and also because the apparatus according to the invention can be operated with direct current, it is eminently suitable for using batteries as the source of energy.

The greatest advantage, however, is that the apparatus produces images which may be viewed with incident light, although they may also be viewed with transmitted light and, if desired, be projected.

When there is applied to the electrodes of the apparatus according to the invention a voltage higher than the minimum required value (threshold voltage) reduction occurs at the cathode, for example

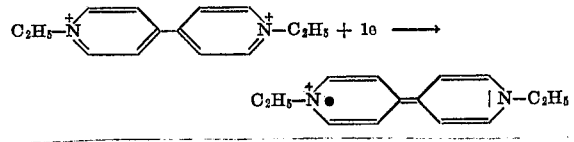

The action radical formed is stable and remains oriented at the cathode. The reduction is reversible, permitting, for example after reversing the polarities of the electrodes, the initial substance to be re-formed.

For the cathode reaction to proceed current must be passed through the medium. Hence the apparatus contains an adjuvant which is oxidized at the anode. Suitable adjuvants are compounds which are reversibly oxidizable, are sufficiently soluble in the medium and do not react with compounds of the formula I. As a result it is sufficient when 0.01 mole/litre of the compounds is dissolved.

Examples of suitable adjuvants are substituted hydroquinones which when measured in water have an oxydation reduction potential of at least 0.7 volts relative to the standard hydrogen electrode. They include hydroquinones substituted with a halogen, CN, $CF_3$, $CCl_3$, or $SCF_3$. Use is preferably made of tetrasubstituted hydroquinones, such as for example 2,3-dichloro-4,5-dicyanohydroquinone and especially tetrahalogenohydroquinone, in particular tetrachlorohydroquinone.

Alternative adjuvants are ferrous salts. However, the anions of these salts must be inert at the voltages used and in the solvent used. Furthermore, the salts must be sufficiently soluble, for example, at a minimum have a solubility of about 0.01 mole per litre. Examples of suitable ferrous salts are ferrous boron tetrafluoride, ferrous acetate, ferrous chloride and the like.

1,4-di(dialkyl amino) benzenes also may be used as adjuvants. The alkyl groups present preferably contain from one to five carbon atoms.

These adjuvants are colourless or at least coloured in so small a degree that their colours do not adversely effect the contrast of the image formed at the cathode.

When tetrachlorohydroquinone is used as the adjuvants, the following reaction takes place at the anode:

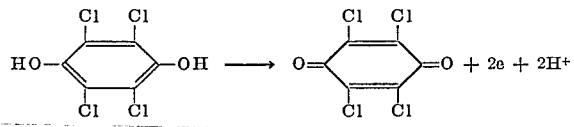

The oxidation product formed at the anode is enabled by diffusion to come into contact with the radial ions formed at the cathode. This gives rise to an oxidation reduction reaction in which the compound of the formula I and the adjuvant are re-formed, for example,

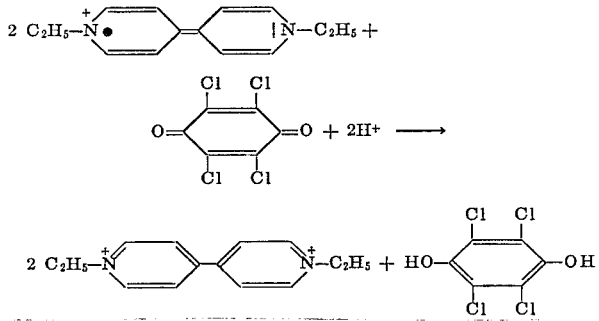

If no current should flow through the medium i.e., if no longer any new radical ions should be formed, the image would be erased by this reaction. If the image is to be maintained, an electrode voltage must be maintained which has a value which exceeds the threshold value to an extent such that the aforementioned reaction is just compensated. As a rule, this voltage is considerably lower than the voltage used for rapid writing.

The said reaction may be utilized to erase the image after the voltage at the electrodes has been removed or the voltage applied to them has been reduced to a value lower than the threshold voltage.

Erasure of the image by reaction of the oxidized substance and the reduced substance (chemical erasure) may be accelerated by reducing the electrode spacing. Conversely, erasure may be retarded by increasing the electrode spacing. Chemical erasure may also be entirely precluded by separating the cathode and anode spaces from one another by a membrane which is impermeable to the oxidizable and reducible substances.

The image may be erased very rapidly by reversing the polarities of the electrodes.

The concentrations of the oxidizable and reducible substances influence the velocity of image formation. According to the use of the apparatus these concentrations will be made higher or lower. In general solutions of at least 0.01 mole per litre will be used. In general, there is no upper limit to the concentration. Thus, saturated solutions or even media containing residual undissolved substance may be used. This may provide an additional advantage. If, for example, to a medium saturated with hydroquinone an additional amount of this substance is added, a white dispersion is obtained against which the coloured image stands out in excellent contrast.

The same effect may be achieved by adding to the medium a chemical inert insoluble compound which is coloured with or has a colour contrasting with the image. An example of such a substance is titanium oxide or the like.

Suitable solvents are inert liquids in which the reducible substance of the formula I and the adjuvant dissolve sufficiently. Examples of such solvents are water and aprotic solvents, such as acetonitrile, propionitrile, glutaridinitrile, benzonitrile, propylene carbonate, nitromethane and acetic acid anhydride.

The halides of the formula I are preferably used in water. However, the boron tetrafluorides may also be used in water. When water is used as the solvent, a ferrous salt or a 1,4-di(dialkylamino) benzene is preferably used as the adjuvant.

When acetic acid anhydride is used, ferrous salts and 1,4-di(dialkylamino) benzene are also preferably used as adjuvants.

Hydroquinones are preferably used in an organic medium. It has been found that quinolates may give rise to the formation of insoluble salts with compounds of the formula I. This may be prevented by the addition of a small amount of an acid. Both inorganic and organic acids may be used for this purpose. As a rule, about 0.5 to 10 percent by weight, calculated with respect to the reaction mixture, will be sufficient.

The electrodes may be made of known inert electrode materials. Examples of stannic oxide, indium oxide, platinum, palladium and gold. Obviously it is not necessary for all electrodes to be made of the same material.

The electrodes may be shaped in a variety of forms. A plurality of anodes and/or cathodes may also be used. Thus, the images produced may be a like in shape to the electrode surface or to the visible part of an electrode partially screened by a mask. The electrode may be locally separated from the liquid by an electrically insulating mask. Alternatively, however, the image may be made up of a plurality of components supplied by an equal number of actuated cathodes.

The apparatus according to the invention operates in the absence of the oxygen and hence the ambient atmosphere must be excluded. Therefore the apparatus is accommodated in an at least partially transparent casing. This may be composed entirely or partially of a transparent plastics material, glass, and the like. When a transparent electrode is used, this may itself be used as one of the walls of the casing, for example in the case of an electrode consisting of stannic oxide on glass.

However, a alternatively opaque electrodes may be used which are suitable arranged. For example, the image formed on the cathode or cathodes may be viewed through an opening formed in the anode.

The potential difference applied to the electrodes during the production of images may be chosen within wide limits. Depending upon the system used, the minimum potential difference will be from 1.2 to 1.3 volts. As a rule voltages higher than 10 volts will not be used.

It has already been mentioned as an advantage of the apparatus according to the invention that it may be operated with direct voltage. However, this does not mean that other voltages, such as a square-wave voltage or an alternating voltage, cannot be used.

The electrodes may be arranged in close proximity to one another, for example ith a spacing of 1 $\mu$m, or wide apart, with a spacing of several tens of centimeters.

The apparatus according to the invention may be used to display information, such as text, symbols and pictures, as a voltage indicator and the like.

The invention will now be described with reference to the following Examples.

EXAMPLE 1

A thin glass slide of 50 by 40 by 0.2 mm provided with a central opening of diameter 10 mm was interposed as a spacer between two glass slides of 50 by 50 by 2 mm which each had one surface coated with a conductive layer of $SnO_2$ (the resistance of the $SnO_2$-layer was 5 ohms; this had been measured by applying a voltage to two conductive strips provided along opposed sides).

Thus, the conductive glass slides, which acted as electrodes, had their conductive surfaces spaced 0.2 mm from one another. In one of the conductive glass slides a charging hole had been formed which could be closed by means of a ground plug. The sides were sealed by means of a 2-component epoxy cement, so that the ambient atmosphere was excluded from the interior of the resulting cell.

Through the hole a solution of ethylviologen boron tetrafluoride (0.1 mole/litre and tetrachlorohydroquinone (0.1 mole/litre in acetonitrile containing 3 percent by weight of acetic acid was introduced into the cell.

The cell was then sealed by inserting the plug. By means of a battery a voltage of 1.5 volts was applied to the electrodes for 100 hours. The colour produced in this period in the space provided by the spacer disappeared in a few seconds on removal of the voltage.

EXAMPLE 2

The spacer mentioned in Example 1 was replaced by a lacquer. For this purpose a glass slide of 50 by 50 by 2 mm, which was coated with a conductive layer of $SnO_2$ (the resistance of the $SnO_2$ layer was 5 ohms), was immersed in a photosensitive negative lacquer on the basis of polyisoprene with 2,6- di- (4'-azidobenzal)- 4-methylcyclohexanone as a cross-linker.

After drying, exposing through a mask, developing in a mixture of 80 percent of p-xylene and 20 percent of ethylmethylketone and hardening at 120°C a coating was obtained in which a text was outlined.

A second glass slide covered with a conductive layer of $SnO_2$ was placed on the coated slide. The assembly was closed along two sides by means of a 2-component epoxy cement, after which a hardening process was performed. Thus, the electrodes were partly isolated from the medium by the lacqer layer, the spacing being 0.01 mm. One of the non-cemented sides was placed in a solution as described in Example 1. As a result, the solution was drawn up between the two slides by capillary forces. The still open sides were then closed with a cellulose adhesive.

A direct voltage of 2 volts was applied to the electrodes. The electrode bearing the text was connected to the negative terminal of the battery used. The text was coloured blue in less than 1 second. After the voltage had been removed from the electrodes, the image lost its colour in less than 1 second.

EXAMPLE 3

The procedure of Example 2 was repeated, with the difference that the conductive layer was made of indium oxide.

EXAMPLE 4

The procedure of Example 2 was repeated, with the difference that one electrode was opaque and consisted of gold vapour-deposited on glass (resistance 2 ohms).

EXAMPLE 5

The procedure of Example 2 was repeated, with the difference that one opaque electrode of platinum-coated glass was used (resistance 2 ohms).

EXAMPLE 6

The procedure of Example 1 was repeated several times. Whilst applying different voltages the time required to obtain an image which absorbed 25 percent, 50 percent or 75 percent of the incedent light was measured.

The measurements were made at 5,990 A.U.

TABLE I

| Absorption | voltage in volts | time in $10^{-3}$ sec. |
| --- | --- | --- |
| 25 % | 2 | 60 |
| 25 % | 3 | 7 |
| 25 % | 4 | 2 |
| 50 % | 2 | 170 |
| 50 % | 3 | 20 |
| 50 % | 4 | 6 |
| 75 % | 2 | 370 |
| 75 % | 3 | 40 |
| 75 % | 4 | 13 |
| 75 % | 5 | 8 |

EXAMPLE 7

The procedure of Example 1 was repeated several times applying increasing voltages across the electrodes. The voltages applied were successively 1.5, 3.5, 4.5, 5.5 and 7.0 volts. The amount of charge to be supplied to the cell to obtain the same optical density was measured. It was found that the charge was the same at all the voltages. This means that the efficiency is independent of the voltage applied. The relationship between the optical density and the charge is shown in Table II

TABLE II

| optical density | charge in mC per sq.cm |
|---|---|
| 0.13 | 0.85 |
| 0.30 | 2.0 |
| 0.60 | 4.1 |

This shows that the optical density is in substantially direct proportion to the charge supplied. The efficiency is higher than 98 percent.

EXAMPLE 8

In a cell consisting of a glass tray two opposed surfaces of which were coated with a conductive layer of $SnO_2$ and served as electrodes the electrode spacing was 1 cm. The surface area of each electrode was 1 sq.cm.

The cell was filled through an opening which could be closed by means of a ground plug. The cell was filled with a solution of ethylviologen boron tetrafluoride (0.1 mole/litre and tetrachlorohydroquinone (0.1 mole/litre) in acetonitrile containing 1.5 percent by weight of acetic acid.

A direct voltage of 3 volts was applied to the two electrodes for 1 second. A blue colour appeared at the cathode. After 1 second the polarity was reversed, whereupon the blue colour disappeared whilst the other electrode was coloured blue.

EXAMPLE 9

The procedure of Example 8 was repeated, with the difference that the solvent, the pulse time and the voltage were varied. The variations are shown in Table III.

TABLE III

| solvent | pulse time in sec. | voltage in volts | acetic acid in % by weight |
|---|---|---|---|
| acetonitrile | 1 | 3 | 0.5 |
| acetonitrile | 0.3 | 4 | 5 |
| glutarodinitrile | 0.7 | 4 | 7.5 |
| propionitrile | 0.5 | 4 | 10 |

The amount of acetic acid was varied from 9.5 to 10 percent by weight.

EXAMPLE 10

The procedure of Example 8 was repeated, with the difference that the ethylviologen borontetrafluoride was replaced by other compounds of the formula I. In addition, the concentration of the respective compound, the pulse time, the voltage and the solvent were varied.

TABLE IV

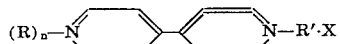

| X | $(R)_n$ $n=1$ | R' | Solvent | Pulse time, seconds | Voltage in volts | Conc. in mole/ liter |
|---|---|---|---|---|---|---|
| $BF_4^-$ | $-C_5H_{11}$ | $-C_5H_{11}$ | Acetone | 0.5 | 3 | 0.1 |
| $ClO_4^-$ | $-C_5H_{11}$ | $-C_5H_{11}$ | do | 0.5 | 3 | 0.1 |
| $BF_4^-$ | $-C_4H_9$ | $-C_4H_9$ | Nitromethane | 1 | 3 | 0.1 |
| $BF_4^-$ | $-CH_3$ | $-CH_3$ | Acetonitrile | 1 | 3 | 0.1 |
| $BF_4^-$ | $-\underset{\underset{CH_3}{\mid}}{\overset{H}{C}}\diagdown CH_3$ | $-\underset{\underset{CH_3}{\mid}}{\overset{H}{C}}\diagdown CH_3$ | do | 1 | 3 | 0.1 |
| $ClO_4^-$ | $-C_2H_5$ | $-C_2H_5$ | do | 1 | 3 | 0.1 |
| $BF_4^-$ | $-C_5H_{11}$ | $-C_5H_{11}$ | do | 1 | 3 | 0.5 |
| $BF_4^-$ | $-C_5H_{11}$ | $-C_5H_{11}$ | do | 1 | 3 | 1.0 |
| $BF_4^-$ | $-C_3H_7$ | $-C_3H_7$ | do | 1 | 3 | 0.1 |
| $BF_4^-$ | $-C_7H_{15}$ | $-C_7H_{15}$ | do | 1 | 3 | 0.1 |
| $BF_4^-$ | $-\overset{H_2}{C}-\overset{H}{C}=\overset{H_2}{C}$ | $-\overset{H_2}{C}-\overset{H}{C}=\overset{H_2}{C}$ | do | 1 | 3 | 0.1 |
| $BF_4^-$ | $-C_{16}H_{33}$ | $-C_{16}H_{33}$ | do | 1 | 4 | 0.05 |
| $BF_4^-$ | $-C_{18}H_{37}$ | $-C_{18}H_{37}$ | do | 1 | 6 | 0.01 |
| $BF_4^-$ | $-\underset{\underset{CH_3}{\mid}}{\overset{H}{C}}-\underset{\underset{O}{\parallel}}{C}-OC_2H_5$ | $-\underset{\underset{CH_3}{\mid}}{\overset{H}{C}}-\underset{\underset{O}{\parallel}}{C}-OC_2H_5$ | do | 1 | 4 | 0.1 |
| | $-\overset{H_2}{C}-(\overset{H_2}{C})_9-C\diagup^O_{OCH_3}$ | $-\overset{H_2}{C}-(\overset{H_2}{C})_9-C\diagup^O_{OCH_3}$ | do | 1 | 4 | 0.05 |
| $BF_4^-$ | $-\overset{H_2}{C}-\overset{}{C}-\underset{O}{N}\diagdown\overset{CH_3}{\underset{CH_3}{O}}$ | $-\overset{H_2}{C}-\overset{}{C}-\underset{O}{N}\diagdown\overset{CH_3}{\underset{CH_3}{O}}$ | do | 1 | 3 | 0.1 |

TABLE IV — Continued $$(R)_n-N\phantom{xx}\phantom{xx}N-R'\cdot X$$

| X | (R)$_n$ n=1 | R' | Solvent | Pulse time, seconds | Voltage in volts | Conc. in mole/ liter |
|---|---|---|---|---|---|---|
| BF$_4^-$ | —C(H$_2$)—C(O)—NH$_2$ | —C(H$_2$)—C(O)—NH$_2$ | do | 1 | 4 | 0.05 |
| BF$_4^-$ | —C$_2$H$_5$ | —C$_2$H$_5$ | do | 0.3 | 4 | 0.1 |
| BF$_4^-$ | —C$_2$H$_5$ | —C$_2$H$_5$ | do | 0.5 | 4 | 0.1 |
| BF$_4^-$ | —C$_2$H$_5$ | —C$_2$H$_5$ | do | 0.7 | 3 | 0.1 |
| BF$_4^-$ | —C$_2$H$_5$ | —C$_2$H$_5$ | do | 1 | 3 | 0.1 |
| BF$_4^-$ | —C$_2$H$_5$ | —C$_2$H$_5$ | do | 2 | 2 | 0.1 |
| BF$_4^-$ | —C$_6$H$_{13}$ | —C$_6$H$_{13}$ | do | 1 | 3 | 0.1 |
| BF$_4^-$ | —CH$_2$—C$_6$H$_5$ | —CH$_2$—C$_6$H$_5$ | do | 1 | 3 | 0.1 |
| BF$_4^-$ | —CH$_2$—C$_6$H$_4$—NO$_2$ | —CH$_2$—C$_6$H$_4$—NO$_2$ | do | 1 | 5 | 0.025 |
| BF$_4^-$ | —CH$_3$ | —C$_5$H$_{11}$ | do | 1 | 3 | 0.1 |
| BF$_4^-$ | —C$_5$H$_{11}$ | —CH$_2$—C(O)—N(morpholine with CH$_3$ groups) | do | 1 | 3 | 0.1 |
| BF$_4^-$ | —C$_6$H$_5$ | —C$_6$H$_5$ [1] | do | 1 | 3 | 0.05 |
| BF$_4^-$ | n=0 | —CH$_3$ | do | 1 | 7 | 0.02 |
| BF$_4^-$ | n=0 | —C$_5$H$_{11}$ | do | 1 | 7 | 0.02 |
| BF$_4^-$ | n= | —C$_3$H$_7$ | do | 1 | 7 | 0.02 |
| BF$_4^-$ | —C≡N | —C≡N | do | 1 | 5 | 0.05 |

[1] This compound was coloured green at the cathode.

EXAMPLE 11

The procedure of Example 8 was repeated, with the difference that the adjuvant, the concentration of the adjuvant, the pulse duration, the solvent and the voltage were varied.

TABLE V

| adjuvant | concentration of the adjuvant | pulse duration in seconds | solvent | voltage in volts |
|---|---|---|---|---|
| tetrachlorohydroquinone | 0.05 | 1 | acetonitrile | 3 |
| do. | 0.1 | 1 | do. | 3 |
| do. | 0.1 | 0.3 | do. | 4 |
| 2,5-dichlorohydroquinone | 1 | 1 | do. | 3 |
| do. | 0.1 | 1 | do. | 3 |
| NNN'N' tetramethyl p.phenylenediamine | 0.1 | 1 | do. | 3 |
| 2,3-dichloro-5,6-dicyanohydroquinone | 0.025 | 1 | do. | 4 |
| Fe(BF$_4$)$_2$ | 0.05 | 1 | do. | 3 |
| FeCl$_2$* | 0.1 | 1 | water | 2.5 |
| FeCl$_2$* | 0.1 | 0.7 | do. | 2.5 |

* These experiments were repeated using the ethyl-viologen chloride and the bromide.

EXAMPLE 12

The procedure of Example 8 was repeated, with the difference that the acid added was varied. The following acids were added in the concentrations shown. (see Table VI).

TABLE VI

| Acid added | concentration in % by weight |
|---|---|
| acetic acid | 1½% |
| do. | 3 % |
| do. | 6 % |
| do. | 10 % |
| propionic acid | 2 % |
| benzoic acid | 4 % |
| sulfuric acid | 2 % |
| HBF$_4$, 40 % in H$_2$O | 2 % |

EXAMPLE 13

The procedure of Example 8 was repeated, with the difference that TiO$_2$ was suspended in the solution in order to increase the contrast in the pulsed operation of the apparatus.

EXAMPLE 14

The procedure of Example 13 was repeated, with the difference that tetrachlorohydroquinone was suspended in the solution in order to increase the contrast in the pulsed operation of the apparatus.

EXAMPLE 15

The electrodes of the apparatus described in Example 8 were partially covered with an insulating white paint so as to produce a blue image in a white frame.

The apparatus described in some of these examples are illustrated in the accompanying drawing.

Figure 2:
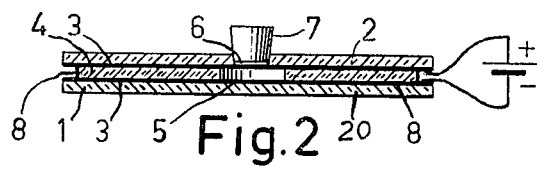
Figure 3:
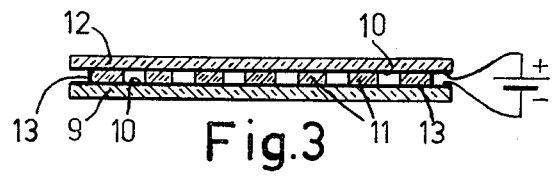
Figure 4:
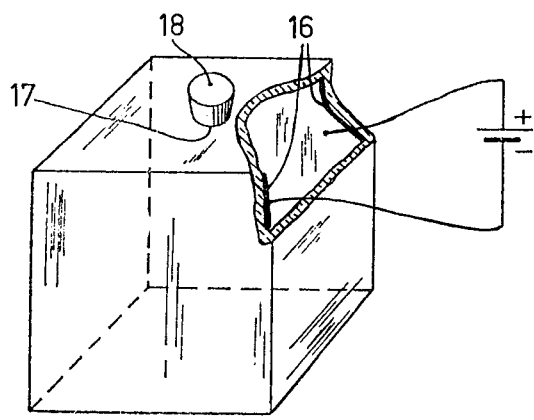

In the drawing, FIG. 1 is a perspective drawing of the apparatus described in Example 1, FIG. 2 is a cross-sectional view of said apparatus, FIG. 3 is a cross-sectional view of the apparatus described in Example 2 and FIG. 4 is a perspective drawing of the tray mentioned in Example 8.

IN FIG. 1

1 and 2 represent each a glass slide of 50 × 50 × 2 mms. 8 is 2-component epoxy cement. 7 is a ground plug.

IN FIG. 2

1 and 2 are each a glass slide. 3 are conductive layers of $SnO_2$ provided on the slides 1 and 2. 4 is a thin glass slide of 50 × 40 × 0.2 mms. 5 is a central opening in 4. 6 is a charging hole in 2. 7 is a ground plug. 8 is 2-component epoxy cement. 20 is a capillary layer containing the solution.

IN FIG. 3

9 and 12 are glass slides of 50 × 50 × 2 mms. 10 are conductive layers of $SnO_2$ provided on the slides 9 and 12. 11 is a coating on the conductive layer 10 of slide 9. 13 is a 2-component epoxy cement.

IN FIG. 4

16 are conductive layers of $SnO_2$ provided on the two opposed surfaces. 17 is an opening in the top of the tray. 18 is a ground plug.

What is claimed is:

1. An image display apparatus comprising a solution of a substantially colorless reversibly reducible organic substance capable of forming a color at a cathode and an adjuvant in an inert solution, means sealed from the atmosphere for containing said solution at least partially transparent to visible light and at least two inert electrodes in contact with said solution, at least one of said electrodes being shaped or masked to form the desired image and wherein the reversibly reducible organic substance is a compound of the formula I

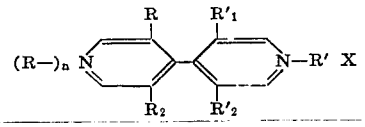

where R and R' represent an alkyl or cycloalkyl group containing up to 18 carbon atoms or an unsaturated alkyl or cycloalkyl group containing up to 12 carbon atoms or an aralkyl or alkaryl group containing up to 10 carbon atoms or a phenyl group, which groups may be substituted in the aromatic nucleus with $CF_3$, a halogen, $CH_3$, $OCH_3$ or $NO_2$, a carbonamido-alkyl group in which the nitrogen atom may carry one or two alkyl groups which together with a hetero-atom may form a ring, which group may contain up to 16 carbon atoms, an alkoxycarbonylalkyl group containing up to 16 carbon atoms, a thienyl alkyl group containing up to 10 carbon atoms, a nitrile group, while R may also represent the group

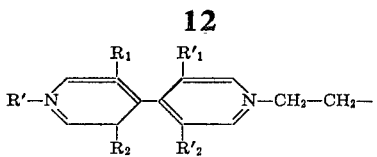

$R_1$ and $R'_1$ each represent a hydrogen atom or together a —CH=CH— group, $R_2$ and $R'_2$, have the same meanings as have $R_1$ and $R'_1$, $n$ is zero or unity and X represents an electrochemically inert anion and the adjuvant is selected from the group consisting of substituted hydroquinones having reduction potentials of at least 0.7 volts, ferrous salts soluble in the solution and having inert anions and 1,4-di(dialkyl amino) benzenes.

2. The image display apparatus of claim 1 wherein the anion of the reversibly reducible organic substance is a member selected from the group consisting of perchlorate, boron tetrafluoride, phosphate and halide ions.

3. The image display apparatus of claim 2 wherein the anion is the boron tetrafluoride ion.

4. The image display apparatus of claim 1 wherein the electrodes are made of a material selected from the group consisting of stannic oxide, indium oxide, platinum, palladium and gold.

5. The image display apparatus as claimed in claim 1 wherein the adjuvant is a substituted hydroquinone which in water has an oxidation reduction potential of at least 0.7 volts measured with respect to the standard hydrogen electrode.

6. The image display apparatus as claimed in claim 5 wherein a hydroquinone substituted with a moiety selected from the group consisting of halogen, CN, $CF_3$, $CCl_3$ and $SLF_3$ is present.

7. The image display apparatus as claimed in claim 6, wherein the adjuvant is a tetra-substituted hydroquinone.

8. The image display apparatus as claimed in claim 7, wherein the adjuvant is a tetrahalogenohydroquinone.

9. The image display apparatus as claimed in claim 8, wherein the adjuvant is tetrachlorohydroquinone.

10. The image display apparatus as claimed in claim 1 wherein the adjuvant used is a ferrous salt.

11. The image display apparatus as claimed in claim 10, wherein the ferrous salt is a member selected from the group consisting of ferrous boron tetrafluoride, ferrous acetate and ferrous chloride.

12. The image display apparatus as claimed in claim 1 wherein the adjuvant used is a 1,4-di(dialkylamino) benzene.

13. The image display apparatus as claimed in claim 12, wherein the adjuvant is a 1,4-di(dialkylamino)-benzene in which the alkyl groups contain up to five carbon atoms.

14. The image display apparatus as claimed in claim 1 wherein the reducible organic substance and the adjuvant are present in concentrations of at least 0.01 mole per litre.

15. The image display apparatus as claimed in claim 5 wherein the apparatus contains a saturated solution of the substituted hydroquinone with residual undissolved substituted hydroquinone.

16. The image display apparatus as claimed in claim 1 wherein a titanium dioxide pigment is dispersed in the solution.

17. The image display apparatus as claimed in claim 1 wherein water or an aprotic solvent is used as the solvent.

18. The image display apparatus as claimed in claim 1 wherein the organic reducible substance used is a halide or a boron tetrafluoride of the formula I, the solvent used is water, and the adjuvant used is a ferrous salt or a 1, 4-di(dialkylamino) benzene.

19. The image display apparatus as claimed in claim 1 wherein the organic reducible substance used is a perchlorate or a boron tetrafluoride of the formula I, the adjuvant used is a ferrous salt or a 1,4-di(dialkylamino) benzene and the solvent used is acetic acid anhydride.

20. The image display apparatus as claimed in claim 5, characterized in that the solution contains an acid.

21. The image display apparatus as claimed in claim 20, wherein acetonitrile is used as the solvent.

22. The image display apparatus as claimed in claim 20, wherein the solution contains from about 0.5 percent to about 10 percent by weight of an acid.

* * * * *